(12) United States Patent
Clowes

(10) Patent No.: US 12,145,180 B2
(45) Date of Patent: Nov. 19, 2024

(54) LASER CLEANING APPARATUS AND METHOD

(71) Applicant: Woodrow Scientific Limited, Southampton (GB)

(72) Inventor: John Redvers Clowes, New Milton (GB)

(73) Assignee: Woodrow Scientific Limited, Southampton (GB)

(*) Notice: Subject to any disclaimer, the term of this patent is extended or adjusted under 35 U.S.C. 154(b) by 0 days.

(21) Appl. No.: 17/927,152

(22) PCT Filed: May 21, 2021

(86) PCT No.: PCT/EP2021/063651
§ 371 (c)(1),
(2) Date: Nov. 22, 2022

(87) PCT Pub. No.: WO2021/239617
PCT Pub. Date: Dec. 2, 2021

(65) Prior Publication Data
US 2023/0191462 A1 Jun. 22, 2023

(30) Foreign Application Priority Data
May 25, 2020 (GB) ...................... 2007769

(51) Int. Cl.
*B08B 7/00* (2006.01)
*B08B 13/00* (2006.01)
(Continued)

(52) U.S. Cl.
CPC ............ *B08B 7/0042* (2013.01); *B08B 13/00* (2013.01); *B23K 26/082* (2015.10); *B23K 26/16* (2013.01);
(Continued)

(58) Field of Classification Search
CPC ..... B08B 7/0042; B08B 13/00; B23K 26/082; B23K 26/16; B23K 26/36; B23K 26/362;
(Continued)

(56) References Cited

U.S. PATENT DOCUMENTS

2019/0101748 A1* 4/2019 Hiereth ................. A61B 18/22

FOREIGN PATENT DOCUMENTS

| CN | 103576431 A | 2/2014 |
| CN | 206966237 U * | 2/2018 |

(Continued)

OTHER PUBLICATIONS

PCT International Search Report and Written Opinion re International Application No. PCT/EP2021/063651, dated Sep. 21, 2021.
(Continued)

*Primary Examiner* — Douglas Lee
*Assistant Examiner* — Emily H Yasharpour
(74) *Attorney, Agent, or Firm* — Downs Rachlin Martin PLLC

(57) ABSTRACT

Laser cleaning apparatus (100) comprising: a laser system (102) configured to output laser light having a power, a wavelength, a temporal characteristic and a divergence; a delivery cable (106) to deliver the laser light to a cleaning head; a cleaning head (110) comprising: an output aperture and output optics (116) configured to focus the laser light (104) to have a fluence at a focal plane (126) that is greater than an ablation threshold of a surface contaminant to be removed from a surface to be cleaned; scanning apparatus (118) to scan the laser light in at least one dimension across a scan region within the focal plane to cause the scanning laser light to have an effective divergence greater than the divergence of the laser light and to have a corresponding safe working distance from the output aperture determined by the effective divergence, the power, the wavelength and
(Continued)

the temporal characteristic; and scan monitoring apparatus (120) to monitor the effective divergence of the scanning laser light and to generate an alarm signal (108) in response to determining that the effective divergence has changed.

18 Claims, 10 Drawing Sheets

(51) Int. Cl.
| | |
|---|---|
| *B23K 26/082* | (2014.01) |
| *B23K 26/16* | (2006.01) |
| *B63B 59/08* | (2006.01) |
| *B63G 8/00* | (2006.01) |
| *B64C 39/02* | (2023.01) |
| *B64U 10/60* | (2023.01) |
| *G08B 21/02* | (2006.01) |
| *H01S 3/00* | (2006.01) |
| *H01S 3/067* | (2006.01) |
| *H01S 3/16* | (2006.01) |

(52) U.S. Cl.
CPC ............ *B63G 8/001* (2013.01); *B64C 39/022* (2013.01); *B64U 10/60* (2023.01); *H01S 3/0007* (2013.01); *H01S 3/0071* (2013.01); *B63B 59/08* (2013.01); *B63G 2008/005* (2013.01); *B64U 2201/10* (2023.01); *G08B 21/02* (2013.01); *H01S 3/067* (2013.01); *H01S 3/1618* (2013.01)

(58) Field of Classification Search
CPC .............................. B23K 26/706; B63G 8/001; B63G 2008/005; B64C 39/022; B64U 10/60; B64U 2201/10; H01S 3/0007; H01S 3/0071; H01S 3/067; H01S 3/1618; H01S 3/005; H01S 3/10; B63B 59/08; G08B 21/02
See application file for complete search history.

(56) References Cited

FOREIGN PATENT DOCUMENTS

| | | | | | |
|---|---|---|---|---|---|
| CN | 108216411 | A | * | 6/2018 | ........... B08B 7/0042 |
| CN | 109515703 | A | * | 3/2019 | |
| GB | 2330653 | A | * | 4/1999 | ........... B08B 7/0042 |
| IL | 147009 | A | | 11/2009 | |
| RU | 2619692 | C1 | * | 5/2017 | |
| WO | WO-2020008398 | A1 | * | 1/2020 | |

OTHER PUBLICATIONS

"Daigle, Jean-Francois, et al. Laser Safety Evaluation for High-Energy Laser Interaction with Solids," Optical Engineering, Soc. of Photo-Optical Instrumentation Engineers, Bellingham, vol. 56, No. 2 (Feb. 1, 2017).

* cited by examiner

LASER CLEANING APPARATUS AND METHOD

TECHNICAL FIELD

The invention relates to a laser cleaning apparatus and to a method of laser cleaning.

BACKGROUND

Lasers that deliver optical energy to a focused spot can be used for materials processing, including melting (welding, cutting etc), nanostructuring and ablation of surface layers or contaminants from a surface.

Applications have been developed using lasers to remove surface contaminants or surface layers, termed "laser cleaning". Typically the laser will be a pulsed laser, typically with a pulse duration below 1 µs and often 100 ns or so in duration, with a pulse energy of the order of milli Joules (mJ) to tens or 100 mJ.

When the pulse of optical energy is focused to a spot (which may be as small as tens of micrometers or several millimeters in spot diameter), the interaction between the optical pulse and the surface of the material being "cleaned" causes the surface contaminant or surface layers to be ejected or ablated provided that the fluence of the beam (the optical energy per unit area) is above the threshold for the particular contaminant or surface layer.

For some cleaning process, such as those involving the removal of dirt from masonry in building cleaning and restoration, the fluence required for satisfactory cleaning can be as low as 1 $J/cm^2$ or up to 2 $J/cm^2$. For applications such as the removal of paint layers from a substrate, the required fluence can be up to 10 $mJ/cm^2$ or more.

In many surface cleaning applications, the surface to be cleaned will be large in area and hence it is preferable to have a larger focused spot size from the laser so that a greater area can be covered when scanning the spot. To achieve this larger spot size (for example 1 mm in diameter) and to have sufficiently high optical pulse energy density ("fluence") within this large spot to overcome the ablation threshold, this often necessitates the use of higher optical powers and pulse energies from the laser source. Sometimes multiple passes of a pulse over a substrate is needed to remove all the contaminant.

In some applications such as cleaning of fine art, it may be preferable to produce tightly focused beams and scan these focused spots over a smaller area to have a more controlled cleaning process. The smaller spot size allows for the use of lower pulse energies and lower optical powers from the laser.

Known laser cleaning systems typically take one of the following forms: an enclosed system in which the laser, scanner and material handling is within an enclosure and an item to be cleaned is put inside the enclosure to be cleaned, with the enclosure containing laser-shields, vacuum to remove debris and interlocks to ensure that the laser can only emit light when the enclosure is "light-tight" and not emitting laser radiation outside of the tool; a laser head and scanner on a robot which moves the beam over an item to be cleaned, typically scanning a laser beam in 1-dimension to produce a line scan that can be moved over the item; and a hand-held device in which the laser beam is delivered to a hand-held scanner such that an operator can position the scanned laser beam over the work surface to remove the contaminant or surface layer from the work piece, with the operator wearing laser safety goggles and the operation often taking place inside a portable light-tight enclosure erected around an object to be cleaned.

In known laser cleaning devices, the laser beam exiting the laser aperture is typically focused to a focal spot a certain distance ("focal length") from the laser aperture and the cleaning of a surface is then carried out with the surface positioned at or close to the focal spot where the intensity of the optical energy is highest. As the position of the laser aperture is moved closer to or further from the surface, the intensity of the optical energy reduces and the cleaning effect can quickly reduce or disappear once the intensity at the surface falls below a certain threshold (determined by the surface and the contaminant material to be removed) at which ablation (material removal) occurs.

Because of this, laser-cleaning tools, and particularly those that are hand held or portable, need to have relatively long working distances, typically between 100 mm and 300 mm from the laser aperture, and to utilize laser beams having a relatively low-beam divergence, i.e. 1-5 milli Radians (mRad), such that the laser beam remains well focused over a longer distance, such as 20-30 mm, to enable the cleaning process to tolerate small changes in position of the cleaning head relative to the surface to be cleaning. The result of having a relatively long focal length, coupled with a relatively large focused spot size (e.g. 1 mm) and high average powers, means that the beam divergence of the laser beam will be low. This means that the Nominal Optical Hazard Distance, NOHD, (the distance at which the beam irradiance or radiant exposure equals the appropriate maximum permissible exposure, MPE, as defined in IEC International Standard 60825-1) for conventional lasers used in cleaning can be as high as 5 km for a 1 kW average power laser, depending on the beam divergence and wavelength.

In addition, for most cleaning applications where a large area of surface needs to be cleaned, a large spot size is preferred so that a greater surface area can be cleaned in a given amount of time. In order to achieve cleaning, the power and pulse energy of the laser beam need to scale in proportion to the area of the focused spot to maintain an energy/power density above the ablation threshold of the contaminant to be removed from the surface.

SUMMARY

It is an object to provide an improved laser cleaning apparatus. It is a further object to provide an improved method of laser cleaning.

An aspect of the invention provides laser cleaning apparatus comprising a laser system, a delivery cable, and a cleaning head. The laser system is configured to output laser light having a power, a wavelength, a temporal characteristic and a divergence. The delivery cable is configured to deliver the laser light to the cleaning head. The cleaning head comprises an output aperture and output optics, scanning apparatus and scan monitoring apparatus. The output optics is configured to focus the laser light to have a fluence at a focal plane of the output optics that is greater than an ablation threshold of a surface contaminant to be removed from a surface to be cleaned. The scanning apparatus is configured to scan the laser light in at least one dimension across a scan region within the focal plane to cause the scanning laser light to have an effective divergence greater than the divergence of the laser light and to have a corresponding safe working distance from the output aperture determined by the effective divergence, the power, the wavelength and the temporal characteristic. The scan monitoring apparatus is configured to monitor the effective divergence of the scanning laser light and is configured to generate an alarm signal in response to determining that the effective divergence has changed.

The laser cleaning apparatus enables eye-safe laser cleaning of surfaces within a public/non-restricted-access space where a passer-by outside a safe working distance can safely view the process without wearing laser safety glasses. A safe working distance is a distance from the aperture where the accessible emission level, AEL, is less than or equal to the MPE. By scanning the laser light across the scan region, the scanning laser light is given an effective divergence that is greater than the divergence of the laser light itself, which reduces the Nominal Ocular Hazard Distance, NOHD, of the laser system. The laser cleaning apparatus thus has a safe working distance (NOHD) that is small enough to make use of the apparatus in a public space practical, with no enclosure around the laser cleaning apparatus—saving time and cost of cleaning.

Advantageously, the scan monitoring ensures that if the scanning of the laser light changes for any reason, changing the effective divergence of the scanning laser light, an alarm is generated.

The laser cleaning apparatus advantageously enables a laser that is not eye-safe, for example a class IV laser, to be safely used for cleaning surfaces in public-access spaces without a physical barrier between the output aperture and members of the public. The laser cleaning apparatus advantageously enables the public to have safe, line-of sight vision of the cleaning process being carried out, without any physical barriers between the viewer and the laser cleaning process.

The laser cleaning apparatus is advantageously able to be used without requiring to be enclosed in a light-safe tent, where people accessing the tent are all trained and wearing laser safety goggles. The laser cleaning apparatus advantageously enables a laser cleaning process to be carried out without the need for a physical enclosure around the laser beam.

In an embodiment, the laser cleaning apparatus further comprises a controller configured to determine the safe working distance of the scanning laser light based on the effective divergence, the power, the wavelength and the temporal characteristic.

In an embodiment, the wavelength is greater than 1400 nm. Having an wavelength within the "eye-safe" wavelength range at which light is absorbed by the cornea and lens may enable the safe working distance to be reduced as compared to shorter wavelengths that are able to penetrate through the cornea and lens to the retina.

In an embodiment, the laser system configured to output laser light having an average power of greater than 100 W. In an embodiment, the laser system configured to output laser light having an average power of greater than 200 W. In an embodiment, the laser system is configured to output laser light having an average power of greater than 1 kW.

In an embodiment, the scanning apparatus is configured to scan the laser light in two dimensions across the scan region. Two dimensional scanning advantageously increases the size of the scan region and thus the effective divergence of the laser light, causing a corresponding reduction in the safe working distance.

In an embodiment, the scan region has a size of up to 200 mm×200 mm, or a size of up to 100 mm×100 mm, or a size of up to 50 mm×50 mm, or a size of up to 20 mm×20 mm.

In an embodiment, the safe working distance is 10 m or less. A safe working distance of 10 m or less advantageously enables the laser system to operate at wavelengths that are not eye-safe, i.e. up to 1400 nm, for example 1064 nm.

In an embodiment, the safe working distance is 4 m or less. A safe working distance of 4 m or less advantageously enables the laser system to operate at longer wavelengths, for example at eye-safe wavelengths, greater than 1400 nm.

In an embodiment, the laser cleaning apparatus further comprises proximity sensing apparatus and interlock apparatus. The proximity sensing apparatus is configured to generate a proximity alarm signal in response to determining the presence of an unauthorised person at a position closer to the output aperture than a permitted access distance. The permitted access distance is greater than or equal to the safe working distance. The interlock apparatus is configured to cause the laser to shut down in response to receiving the proximity alarm signal. The proximity sensing apparatus advantageously ensures that the laser system can only operate when no unauthorised persons (i.e. people not involved in the laser cleaning process and not wearing laser safety glasses) are closer to the laser system's output aperture than the permitted access distance.

The proximity sensing apparatus advantageously implements a virtual barrier or geo-fence around the cleaning head ensuring that unauthorised persons cannot approach closer than the permitted access distance without requiring the establishment of a physical barrier or enclosure around the area in which the laser cleaning is taking place-saving time and cost of cleaning.

In an embodiment, the proximity sensing apparatus is configured to set the permitted access distance in response to receiving the alarm signal from the scan monitoring apparatus. The permitted access distance can thus be changed in response to a change in the effective divergence of the scanning laser light.

In an embodiment, the scan monitoring apparatus is further configured to determine an amount of change of the effective divergence of the scanning laser light and the generated alarm signal carries information indicative of the amount of change of the effective divergence. The controller is further configured to determine the permitted access distance dependent on the amount of change of the effective divergence and to generate a control signal configured to cause the proximity sensing apparatus to operate using the determined permitted access distance. The permitted access distance can thus be changed as the effective divergence of the scanning laser light varies.

In an embodiment, the proximity sensing apparatus comprises a camera configured to determine at least one of a presence of a body and a distance to a body and/or a range detector configured to determine a distance to a body and/or a laser scanner configured to determine at least one of a presence of a body and a distance to a body.

In an embodiment, the controller is further configured to determine a size for the scan region in response to receiving the proximity alarm signal. The size is determined to change the effective divergence and reduce the safe working distance. The controller is configured to generate a control signal configured to cause the scanning apparatus to scan the laser light across a scan region having the determined size. The safe working distance can thus be reduced in response to detecting the presence of an unauthorised person at a distance closer than the permitted access distance, advantageously enabling the laser cleaning process to remain being safe to be viewed by the detected person.

In an embodiment, the laser cleaning apparatus further comprises interlock apparatus configured to cause the laser to shut down in response to receiving the alarm signal from the scan monitoring apparatus.

In an embodiment, the cleaning head is of a size and weight such that it can be held and moved with a user's hand. Advantageously, an operator is able to manually move the cleaning head over a surface to be cleaned.

In an embodiment, the laser cleaning apparatus further comprises at least one unmanned remote vehicle. The cleaning head is mounted on the at least one unmanned remote vehicle. Advantageously, surfaces at a height above floor/ground level can be cleaned by movement of an unmanned remote vehicle moving the cleaning head over a surface to be cleaned; buildings, large structures, monuments etc. can thus be cleaned using the laser cleaning apparatus without the need to provide an enclosure and scaffolding around the building, structure or monument-saving time and cost of cleaning.

In an embodiment, the delivery cable is further configured to tether the at least one unmanned remote vehicle to the laser system. A range of movement of the unmanned remote vehicle can thus be controlled.

In an embodiment, the laser cleaning apparatus comprises a first unmanned remote vehicle and a second unmanned remote vehicle tethered to the first unmanned remote vehicle. The laser system is mounted on the first unmanned remote vehicle and the cleaning head is mounted on the second unmanned remote vehicle. The delivery cable extends between the first unmanned remote vehicle and the second unmanned remote vehicle.

In an embodiment, the proximity sensing apparatus is provided on at least one of the first unmanned remote vehicle and the second unmanned remote vehicle.

In an embodiment, the laser cleaning apparatus further comprises a camera arranged to record images of the surface to be cleaned. The controller is configured to receive the images from the camera. The controller is further configured to determine from the images a type of surface contaminant present on the surface to be cleaned. The controller is further configured to determine the size for the scan region dependent on the type of surface contaminant. The controller is further configured to generate at least one control signal configured to cause the scanning apparatus to scan the laser light across the scan region having the determined size.

Provision of the camera enables the apparatus to determine the type of contamination on a surface to be cleaned, enabling to size of the scan region to be varied to optimally remove the surface contaminant from the surface to be cleaned. The camera also enables the apparatus to determine whether the contaminant has successfully been removed from the surface, enabling real-time evaluation of the level of cleanliness.

In an embodiment, the controller is further configured to determine from the images a level of contamination on the surface to be cleaned. The controller is further configured to generate a control signal configured to cause the scanning apparatus to re-scan the laser light across the scan region dependent on a remaining level of contamination determined from the images received from the camera.

Provision of the camera enables the apparatus to determine the level of contamination on a surface to be cleaned, enabling the apparatus to determine whether the contaminant has successfully been removed from the surface, enabling real-time evaluation of the level of cleanliness and rescanning to be performed if the level of contamination remains unacceptably high.

In an embodiment, the camera arranged to record images of the surface to be cleaned is provided on the at least one unmanned remote vehicle.

In an embodiment, the unmanned remote vehicle is one of an unmanned aerial vehicle, UAV, an unmanned sub-marine vehicle or a unmanned ground vehicle.

Corresponding embodiments and advantages also apply to the method described below.

An aspect of the invention provides a method of laser cleaning comprising the following steps: providing laser light having a power, a wavelength, a temporal characteristic and a divergence; focussing the laser light to have a fluence at a focal plane that is greater than an ablation threshold of a surface contaminant to be removed from a surface to be cleaned; scanning the laser light in at least one dimension across a scan region within the focal plane to cause the scanning laser light to have an effective divergence greater than the divergence of the laser light and to have a corresponding safe working distance from the output aperture determined by the effective divergence, the power, the operating wavelength and the temporal characteristic; monitoring the effective divergence of the scanning laser light and generating an alarm signal in response to determining that the effective divergence has changed.

In an embodiment, the method further comprises steps of: monitoring an area extending from the surface to be cleaned to at least a permitted access distance, wherein the permitted access distance is greater than or equal to the safe working distance; generating a proximity alarm signal in response to determining the presence of an unauthorised person at a position closer than the permitted access distance; and causing the laser to shut down in response to receiving the proximity alarm signal. The steps of proximity sensing advantageously implement a virtual barrier or geo-fence around the area in which the laser cleaning is taking place, ensuring that unauthorised persons cannot approach closer than the permitted access distance without requiring the establishment of a physical barrier or enclosure around the area-saving time and cost of cleaning.

DETAILED DESCRIPTION

Figure 1:
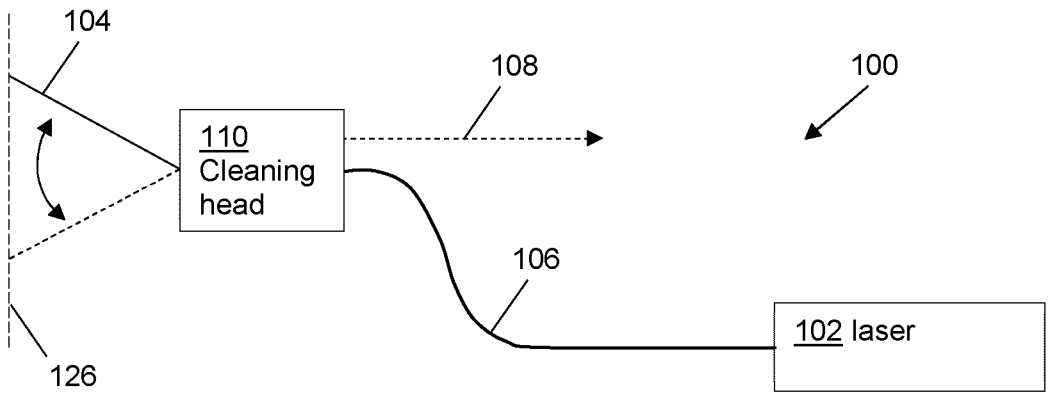
FIGS. 1 to 14 illustrate embodiments of laser cleaning apparatus.
Figure 2:
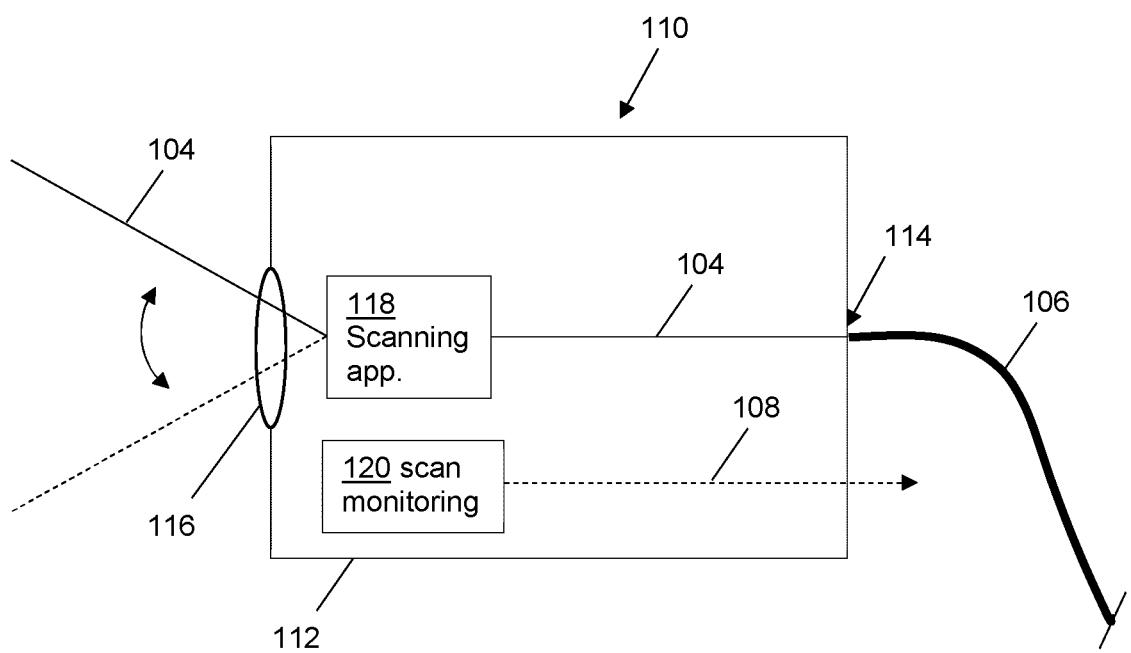

Referring to FIGS. 1 and 2, an embodiment provides laser cleaning apparatus 100 comprising a laser system 102, a delivery cable 106, and a cleaning head 110.

The laser system is configured to output laser light having a power, a wavelength, a temporal characteristic and a divergence. The wavelength may be any wavelength suitable for laser cleaning, including: wavelengths up to 1400 nm, for example 532 nm, 1 µm, 1064 nm; wavelengths over 1400 nm, for example 1550 nm and other wavelengths within the emission bandwidth of Erbium glass and erbium doped crystals: longer wavelengths in the region of 2 µm, within the emission bandwidth of Thulium and Holmium doped glasses and crystals; or wavelengths in the short wavelength infrared or Mid-infrared region of the spectrum beyond 2000 nm.

Temporal characteristic refers to a characteristic of the distribution of the optical power of the laser light over time; for example, the laser system may output continuous wave, CW, laser light, or may output pulsed laser light, the temporal characteristic relating to the duration and frequency of the pulses.

The delivery cable 106 is configured to deliver the laser light to a cleaning head and may, for example, comprise an optical cable including an optical fibre.

The cleaning head 110 comprises a housing 112, input optics 114, an output aperture and output optics 116, scanning apparatus 118 and scan monitoring apparatus 120. The input optics 114 is configured to receive the laser light from the delivery cable. The output optics is configured to receive the laser light from the scanning apparatus. The output optics has a focal plane 126 and is configured to focus the laser light 104 to have a fluence at the focal plane that is greater than an ablation threshold of a surface contaminant to be removed from a surface to be cleaned.

The scanning apparatus 118 is configured to receive the laser light from the input optics and direct the laser light to the output optics. The scanning apparatus is configured to scan the laser light in at least one dimension across a scan region within the focal plane of the output optics, to cause the scanning laser light to have an effective divergence greater than the divergence of the laser light and to have a corresponding safe working distance from the output aperture determined by the effective divergence, the power, the wavelength and the temporal characteristic.

The laser light inherently has a divergence and scanning the laser light causes the scanning laser light to have an effective divergence that is greater than the divergence of the laser light. The scan monitoring apparatus 120 is configured to monitor the effective divergence of the scanning laser light and is configured to generate an alarm signal 108 in response to determining that the effective divergence has changed. For example, the scan monitoring apparatus may be configured to monitor that scanning is occurring and/or a scan speed and/or the extent of the scan across one or more dimensions of the scan region. A change in any of these is indicative that the effective divergence has changed.

A safe working distance is a distance from the output aperture where the accessible emission level, AEL, is less than or equal to the Maximum Permissible Exposure, MPE. An MPE is a level of laser exposure which it is believed an individual could be exposed to without incurring an injury. An MPE may therefore be considered as a maximum safe level of exposure; any Accessible Emission level (the amount of laser radiation/light that a person can access) below the MPE is therefore considered to be safe. MPE levels are specified for both the eye and skin as a function of the wavelength of the laser radiation and the duration of exposure to the laser radiation (the "exposure duration"). The nominal ocular hazard distance, NOHD, is the distance at which the beam irradiance or radiant exposure equals the appropriate MPE. NOHD, laser classes and MPE values are internationally agreed and defined in the International Electrotechnical Commission, IEC, Standard 60825-1 "Safety of laser products".

Laser beam divergence is an angular measure of the increase in beam diameter or radius with distance from the optical aperture from which the beam emerges. The effective divergence of the scanning laser light is a time-averaged divergence and is given by the dimensions of the scan region in the case where the scanning laser light is scanned across the entire scan region in a time shorter than the exposure duration over which the appropriate MPE is calculated. If the scanning is slow, and the scan region is covered by the scanning laser light in a time longer than the exposure duration, then the effective divergence of the scanning laser light is also dependent on the scan speed.

Figure 3:
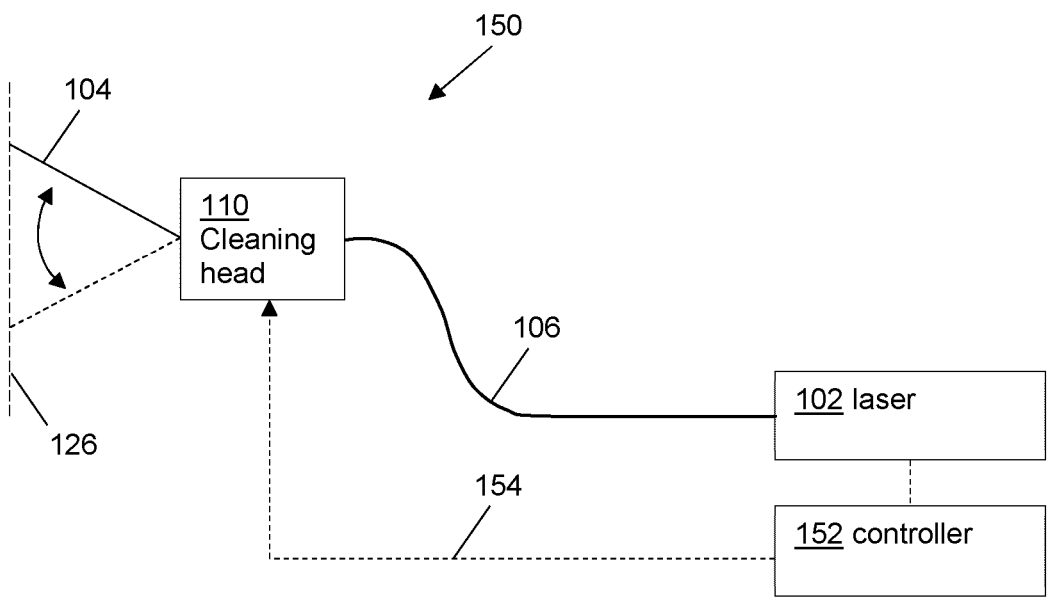

In an embodiment, illustrated in FIG. 3, the laser cleaning apparatus 150 further comprises a controller 152 configured to determine the safe working distance of the scanning laser light based on the effective divergence, the power, the wavelength and the temporal characteristic.

The controller may be implemented as one or more processors, hardware, processing hardware or circuitry. References to processors, hardware, processing hardware or circuitry can encompass any kind of logic or analog circuitry, integrated to any degree, and not limited to general purpose processors, digital signal processors, ASICs, FPGAS, discrete components or logic and so on. References to a processor are intended to encompass implementations using multiple processors which may be integrated together, or co-located in the same node or distributed at different locations for example.

Figure 4:
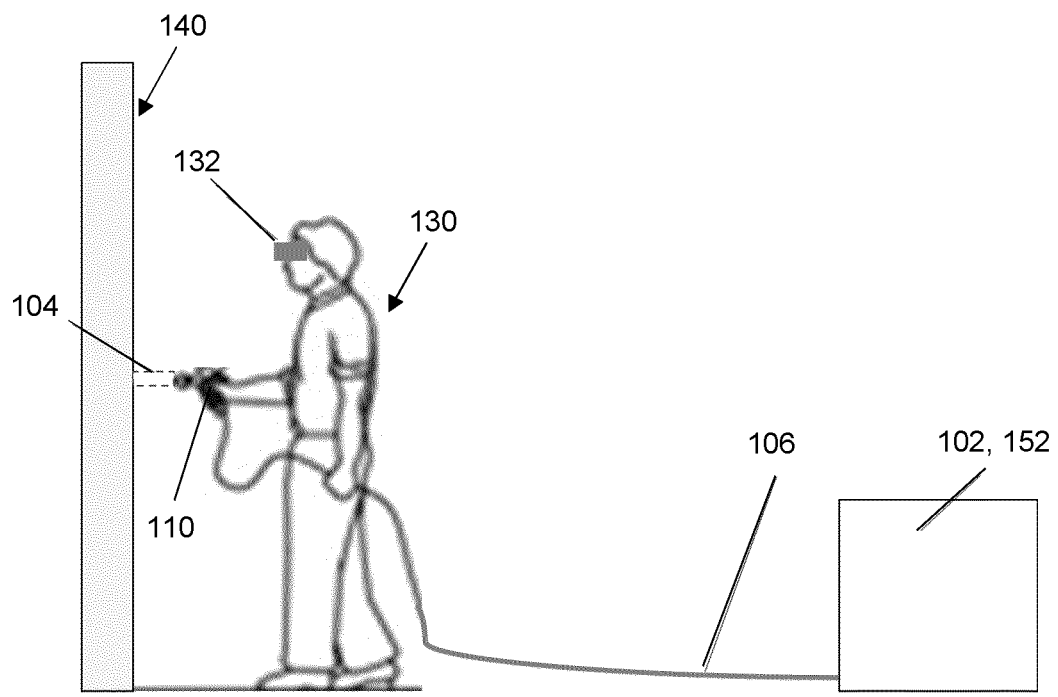
Figure 5:
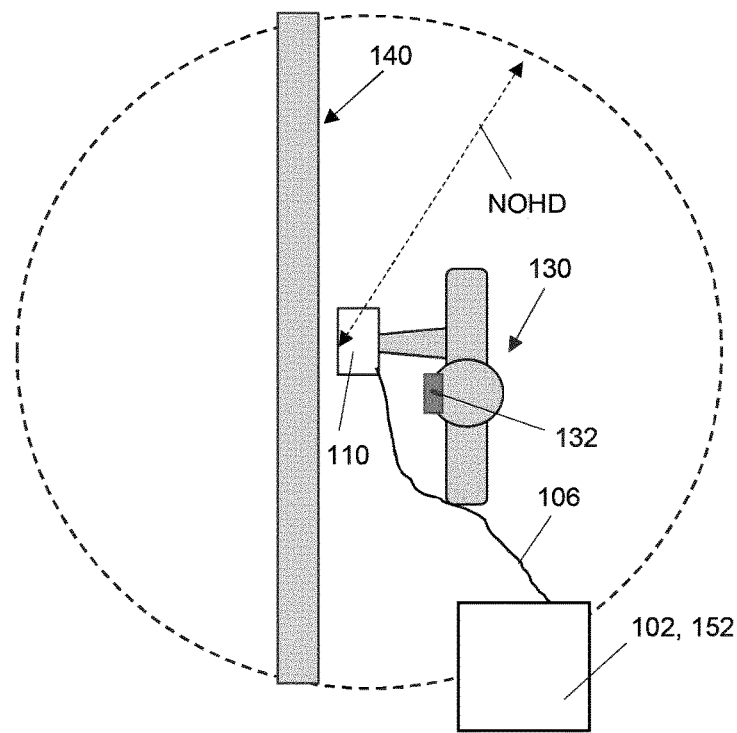

As illustrated in FIGS. 4 and 5, the cleaning head 110 may be of a size and weight such that it can be held and moved with an operator's hand so that the scan region is located at the surface to be cleaned and the scan region is moved across the surface to be cleaned by the operator moving the cleaning head. It will be appreciated that the scan region/focal plane of the scanning laser light does not need to be exactly at the surface to be cleaned for at least some cleaning to occur, but optimum cleaning will be achieved when this condition is met as the spot size of the laser light will be at its smallest, and thus the fluence will be at its highest.

The delivery cable 106 may be an armoured, multimode optical fiber cable having fibre core dimensions of 400 µm and a length of up to 50 meters, allowing remote location of the laser system 102 with respect to the cleaning head and enabling cleaning over a large distance without needing to move the laser system etc.

An operator 130 wearing laser safety glasses 132 is permitted to be within a permitted access distance, greater than or equal to the NOHD, of the laser cleaning apparatus 100, to clean a surface 140. Non-authorised persons located outside the permitted access distance may safely view the laser cleaning process without wearing laser safety glasses because the determined size for the scan region causes the effective divergence of the scanning laser light to have an AE level that is less than the MPE of the laser light, for its wavelength and temporal characteristic.

In an embodiment, the wavelength is greater than 1400 nm, in this example 1550 nm.

In an embodiment, the safe working distance is 10 m or less.

In an embodiment, the safe working distance is 4 m or less.

Figure 6:
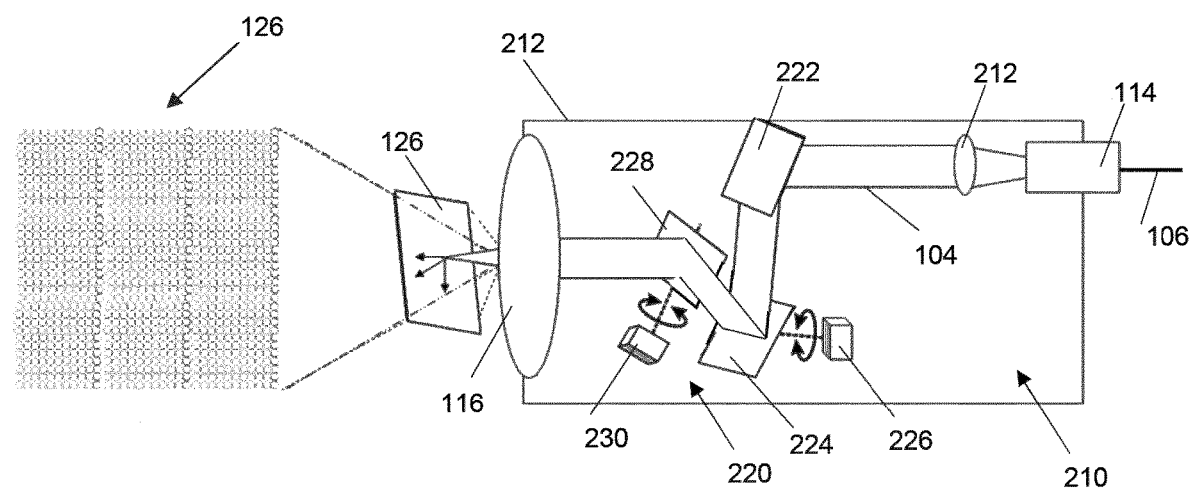

FIG. 6 illustrates the cleaning head 210 of a laser cleaning apparatus according to an embodiment of the invention in which the scanning apparatus 220 is configured to scan the laser light in two dimensions across the scan region 126.

The scanning apparatus 220 comprises a first scanning mirror 224 configured to scan the laser light 104 in a first dimension and a second scanning mirror 228 configured to scan the laser light in a second dimension. The scanning mirrors may be galvanometer scanning mirror or mems scanning mirrors.

The laser light from the input optics 114 is collimated with a lens 212 and directed to the first scanning mirror with a fixed mirror 222. The scan monitoring apparatus comprises a first motion monitor 226 configured to monitor the scanning motion of the first scanning mirror and a second motion monitor 230 configured to monitor the scanning motion of the second scanning mirror. Monitoring the scanning motion of the two mirrors enables the scan monitoring apparatus to determine that the effective divergence of the scanning laser light has changed.

In a 2-D scan, the optical energy of the laser light is better homogenized across the scan region than in a 1-D scan. For example, a 1 mm spot size at the scan region of a 1 kW, 10 KHz pulsed laser, scanned over a 100 mm×100 mm square per second, would result in the entire scan region being exposed to a single pulse per second. The effective divergence of the scanned laser light is dramatically increased compared to stationary laser light or 1-D scanned light.

In an embodiment, the motion monitors are configured to monitor an electrical drive signal to the scanning mirror. In an alternative embodiment the motion monitors are configured to monitor the mechanical motion of the mirror. In another embodiment, the motion monitors comprise optical detectors configured to sample the laser light and to measure the power spectral density; the motion monitors are configured to determine a change in the power spectral density, indicating that the bean scanning is no longer working correctly.

In an embodiment, the laser system is a high power, high pulse energy laser, for example a short pulse, Erbium-doped fibre laser which delivers 100 ns duration pulses at up to 100 mJ pulse energy at a repetition rate of 10 KHz and an average power of 1000 Watts. The laser light is delivered to the cleaning head via an armoured, multimode optical fiber delivery cable having fibre core dimensions of 400 μm and of length up to 50 meters, allowing remote location of the laser system and controller with respect to the cleaning head and enabling cleaning over a large distance without needing to move the laser system and controller.

The output optics 116 comprises an f-theta lens of focal length 200 mm at the output aperture which focusses the beam to a spot diameter of approximately 1 mm at the beam waist (focal plane), 200 mm from the aperture.

The laser light is a beam having a resulting beam divergence of approximately 1 mRad; the power density of the laser light at the waist is approximately $1.3 \times e^5$ W/cm$^2$ and the fluence of the pulses at the waist is approximately 12.7 J/cm$^2$ which is above the ablation threshold for removing a selected contaminant from the surface to be cleaned.

The controller is configured to generate control signals to the two scanning mirrors such that the laser light is moved at a speed of approximately 10 m/sec such that the focused laser light at the focal plane is scanned across a scan region having a size of approximately 100 mm by 100 mm, delivering the 1000 Watts of average power and 10,000 pulses per second, evenly distributed across the 100 mm×100 mm scan region.

The scanning is configured such that, every second, every square mm of the 100 mm×100 mm is exposed to one pulse, having a fluence of approximately 12.7 mJ/cm$^2$ which is above the ablation threshold required to remove contaminant from the area of surface exposed to the 1 mm diameter beam.

The cleaning head can be held stationary for more than 1 second such that multiple pulses pass over the area if 100% ablation and cleaning is not achieved by a single pulse. Alternatively, the cleaning head can be moved across a larger area of the surface to be cleaned, making multiple passes of the 100 mm×100 mm scan region over the surface over time.

The scanning laser light has an effective divergence of approximately 500 mRad, resulting in an effective "beam" of laser light that would measure 1 m×1 m if projected on a surface approximately 2 m away from the output aperture.

At a distance of approximately 2.2 m from the output aperture, the power density of the scanning laser light has reduced such that the AE level for the human eye for this 1550 nm laser light is below the MPE for the relevant exposure duration and the scanning laser light is deemed to be eye-safe.

In another embodiment, the laser system is a short pulsed laser, for example an Ytterbium doped fiber laser having a wavelength of 1064 nm and configured to deliver 100 ns duration pulses at a pulse energy of approximately 10 mJ and at a repetition rate of 50 KHz and average power of 500 Watts.

The laser light is delivered to the cleaning head via an optical cable of 100 m in length.

Within the laser cleaning head, the laser light is focused to a spot size of approximately 0.5 mm at the focal plane, 200 mm from the output aperture, resulting in a pulse fluence of approximately 5.1 J/cm$^2$ at the focal plane.

The controller is configured to generate control signals to the two scanning mirrors such that the laser light is scanned in a random pattern over scan region having a size approximately 100 mm×100 mm, providing almost homogeneous scanning of the 100 mm×100 mm area.

The effective divergence of the scanning laser light is approximately 500 mRad.

According to the IEC laser safety standard, the AE level for the scanning 1064 nm pulsed laser light reaches a value below the MPE Level for retinal damage at a distance of approximately 7.1 m from the output aperture, i.e. the safe working distance (NOHD) is approximately 7.1 m.

In an embodiment, the laser system is a 1550 nm short-pulse fiber laser, delivering pulses of approximately 200 ns pulse duration and a pulse energy of 10 mJ at a repetition rate of 5 kHz and an average power of approximately 50 watts. The output optics is a 200 mm focal length F-theta lens that focuses the laser light to a spot size of approximately 0.25 mm at the focal plane, approximately 200 mm from the output aperture. The fluence of the pulses at the focal plane is approximately 20 J/cm$^2$, above the ablation threshold for a wide variety of contaminants to be removed from a surface.

The controller is configured to generate control signals to the two scanning mirrors such that the laser light is scanned in a raster-scan manner over a scan region having a size approximately 18 mm×18 mm, providing almost uniform distribution of the 50 watts power and 50,000 pulses per second over the scan region.

The effective divergence of the scanning laser light is approximately 90 mRad and, at a distance of approximately 2.8 m from the laser aperture, the power density of the scanning laser light, and hence the AE level, falls below the MPE Level for the laser light.

Figure 7:
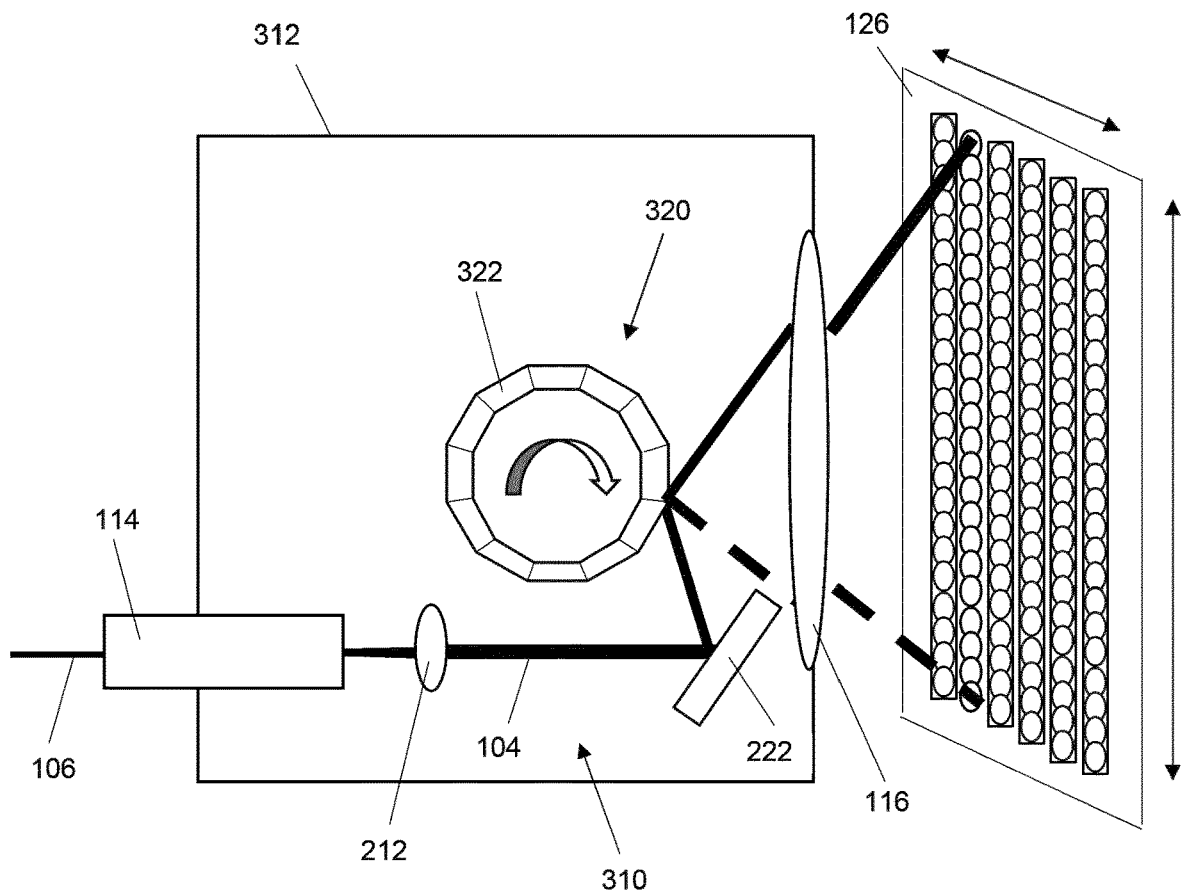

FIG. 7 illustrates the cleaning head 310 of a laser cleaning apparatus according to another embodiment of the invention in which the scanning apparatus 320 is configured to scan the laser light in two dimensions across the scan region 126.

The scanning apparatus 320 comprises a rotating mirrored polygon 322. The facets of the polygon are each angled differently, so that subsequent facets are at a slight angle to each other; this causes the laser light 104 to undergo a 'raster' type scan, in which the laser light is scanned (as orientated in the drawings) vertically as each facet is rotated and is moved horizontally to the next vertical scanning position by the subsequent facet.

For example, 28 sided rotating mirrored polygon may be configured to give a vertical scan extent of about 90 mm and 28 discrete lines in the vertical. Allowing for a bit of overlap between the vertical scans, a scan region having a size of 90×25 mm may be achieved.

Figure 8:
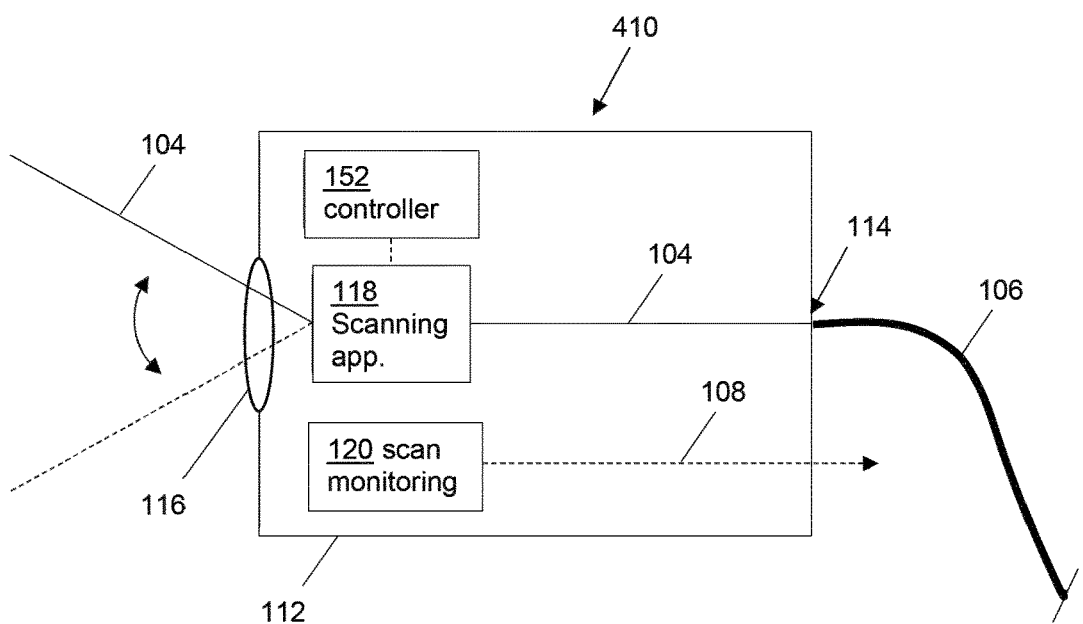

Referring to FIG. 8, in an embodiment the controller 152 is provided in the cleaning head 410.

Figure 9:
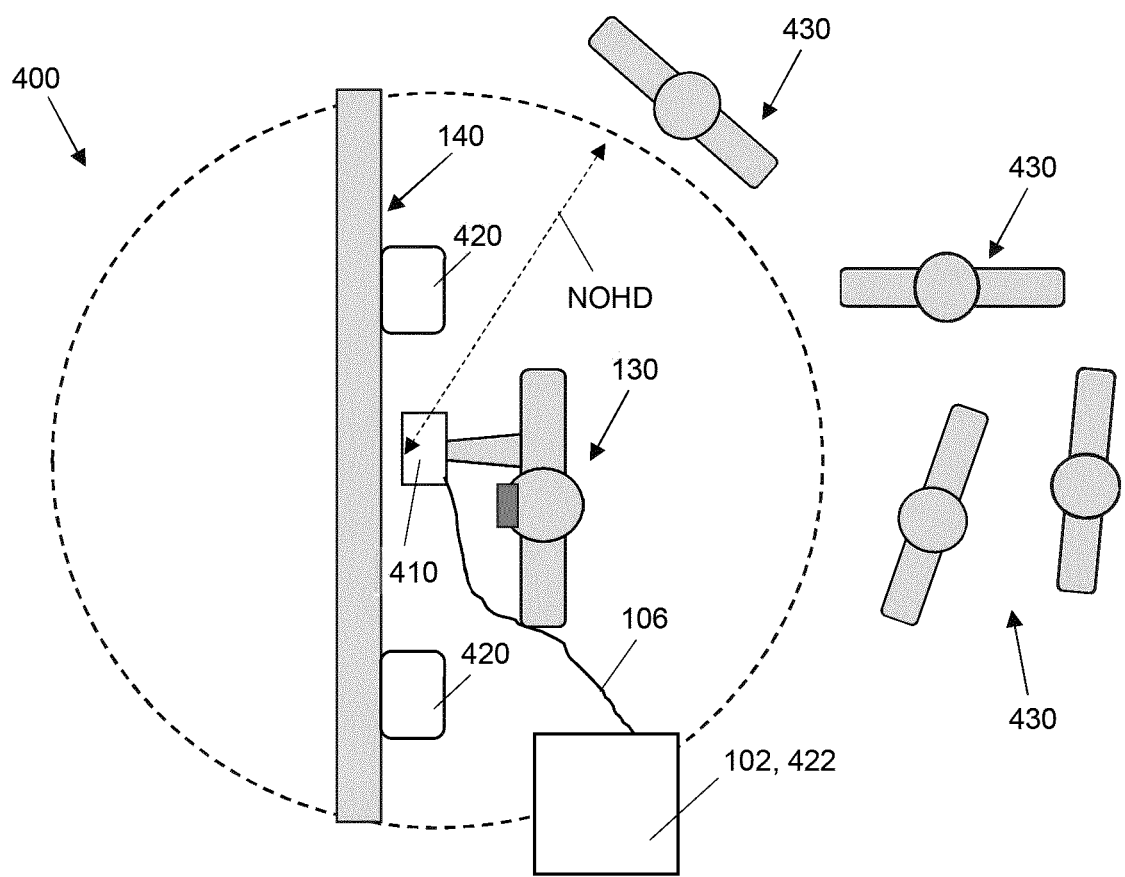

Referring to FIG. 9, in an embodiment the laser cleaning apparatus 400 further comprises proximity sensing apparatus 420 and interlock apparatus 422. The proximity sensing apparatus 420 is configured to monitor the space around the cleaning head to detect the presence of any unauthorised person who gets closer to the output aperture of the cleaning head than a permitted access distance. The proximity sensing apparatus thus creates a virtual barrier or geo-fence around the cleaning head 410.

The proximity sensing apparatus is configured to generate a proximity alarm signal in response to determining the presence of an unauthorised person 430 at a position closer to the output aperture than a permitted access distance. The permitted access distance is greater than or equal to the safe working distance (NOHD). For example, the permitted access distance may be up to 10% greater than the safe working distance or it may be up to 20% greater than the safe working distance.

The interlock apparatus 422 is configured to cause the laser system 102 to shut down in response to receiving the proximity alarm signal.

In this embodiment, the proximity sensing apparatus 420 is configured to be mounted on or near the surface to be cleaned, so that it has a field of view, outwardly from the surface to be cleaned, that includes the cleaning head, the operator 130 and an area beyond the NOHD, in which non-authorised persons 430 may be present and may be safely watching the cleaning process.

In an embodiment, the proximity sensing apparatus 420 is configured to set the permitted access distance in response to receiving an alarm signal 108 from the scan monitoring apparatus 120 in the cleaning head 410.

In an embodiment, the scan monitoring apparatus 120 is further configured to determine an amount of change of the effective divergence of the scanning laser light. The alarm signal 108 generated by the scan monitoring apparatus in response to determining that the effective divergence has changed carries information indicative of the amount of change of the effective divergence. The controller 152 is further configured to determine the permitted access distance dependent on the amount of change of the effective divergence. The controller is also configured to generate a control signal configured to cause the proximity sensing apparatus to operate using the determined permitted access distance.

In an embodiment, the controller 152 is further configured to determine a size for the scan region in response to receiving the proximity alarm signal. The size is determined to change the effective divergence and reduce the safe working distance. The controller is further configured to generate a control signal 154 configured to cause the scanning apparatus to scan the laser light across a scan region having the determined size.

In an embodiment, the proximity sensing apparatus 420 is further configured to determine a distance from the unauthorised person to the output aperture of the cleaning head 410. The controller 152 is further configured to determine a size for the scan region in response to receiving the proximity alarm signal. The size is determined to change the effective divergence and thus reduce the safe working distance.

Figure 10:
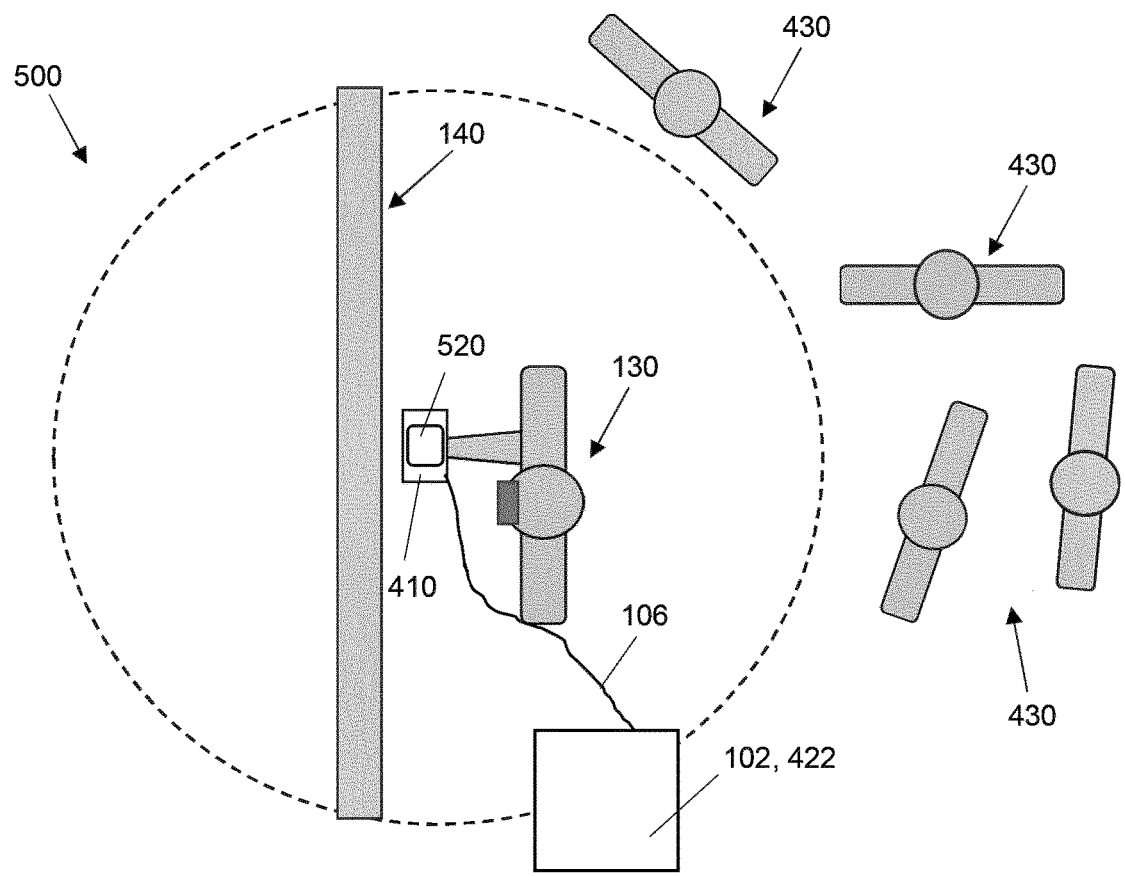

Referring to FIG. 10, in an embodiment the laser cleaning apparatus 500 comprises proximity sensing apparatus 520 mounted on the cleaning head 410. The proximity sensing apparatus is configured so that it has a field of view, outwardly from the cleaning head, that includes the operator 130 and an area beyond the permitted access distance, in which non-authorised persons 430 may be present and may be safely watching the cleaning process. The proximity sensing apparatus or one part of the proximity sensing apparatus May alternatively or also mounted on the operator of the hand-held laser cleaning head, enabling a full field of view and preventing the operator from blocking this field of view.

In either the embodiments of FIG. 9 and FIG. 10, the proximity sensing apparatus 420, 520 may comprise one or more cameras configured to determine at least one of a presence of a body and a distance to a body, i.e. an unauthorised person. The proximity sensing apparatus may alternatively or additionally comprise one or more range detectors configured to determine a distance to a body. The proximity sensing apparatus may alternatively or additionally comprise one or more laser scanners to determine at the presence of a body and a distance to a body. The proximity sensing apparatus 420, 520 may be configured to recognise the operator 130 and thus not generate a proximity alarm in response to the operator being closer than the permitted access distance.

Figure 11:
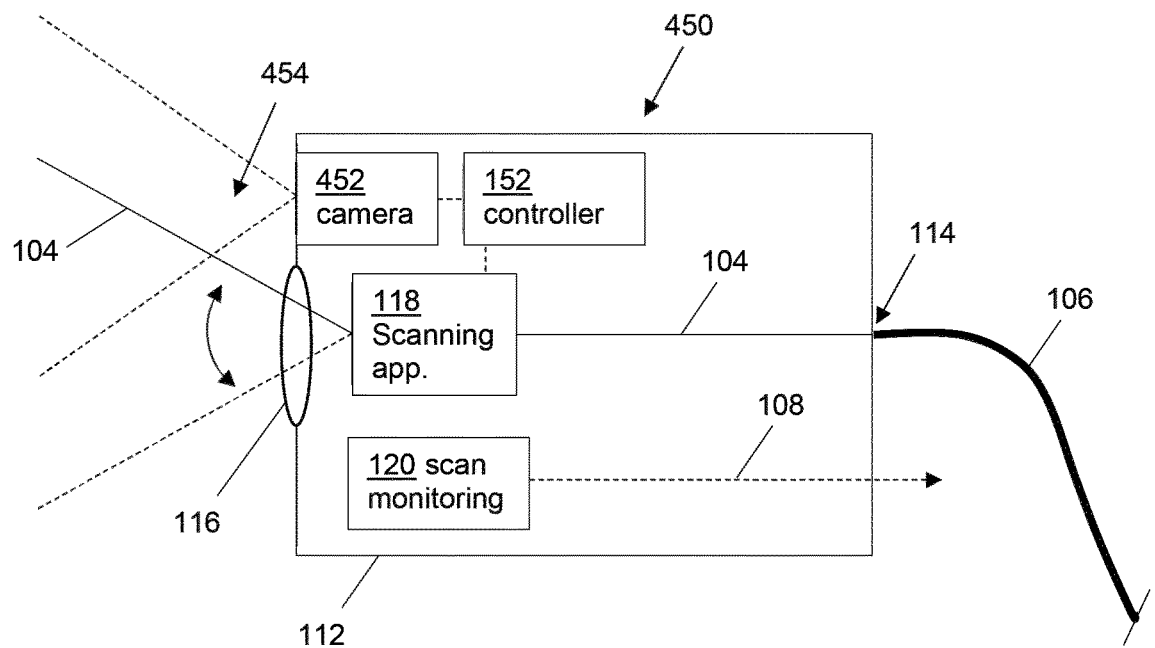

In an embodiment, illustrated in FIG. 11, the laser cleaning apparatus further comprising a camera 452 arranged to record images of the surface to be cleaned. In this embodiment, the camera is provided within the cleaning head 450. The camera has a field of view 452 that includes the surface to be cleaned.

The controller is configured to receive the images from the camera of the surface to be cleaned, and to determine from the images a type of surface contaminant present on the surface to be cleaned. The controller is further configured to determine various parameters for the apparatus, including: laser wavelength, laser temporal characteristic and the size of the scan region, dependent on the type of surface contaminant, the chosen safe working distance and the Maximum Permissible Exposure level (MPEL).

The controller is configured to generate at least one control signal configured to configure the laser system 102 to output laser light having the wavelength and the temporal characteristic and to cause the scanning apparatus 118 to scan the laser light across the scan region having the determined size.

The controller 152 may also be operable to determine a scanning speed, an amount of overlap between pulses, and a number of passes of the laser light across the scan region for the scanning apparatus. It generates a further control signal to configure the scanning apparatus to perform scanning at the determined scan speed, amount of overlap and number of passes.

Provision of the camera enables the apparatus to determine the type and/or level of contamination on a surface to be cleaned, enabling operating parameters to be varied to optimally remove the surface contaminant from the surface to be cleaned. The camera also enables the apparatus to determine whether the contaminant has successfully been removed from the surface, enabling real-time evaluation of the level of cleanliness.

In an embodiment, the controller 152 is further configured to generate a control signal configured to cause the scanning apparatus to re-scan the laser light across the scan region dependent on a remaining level of contamination determined from the images received from the camera.

Figure 12:
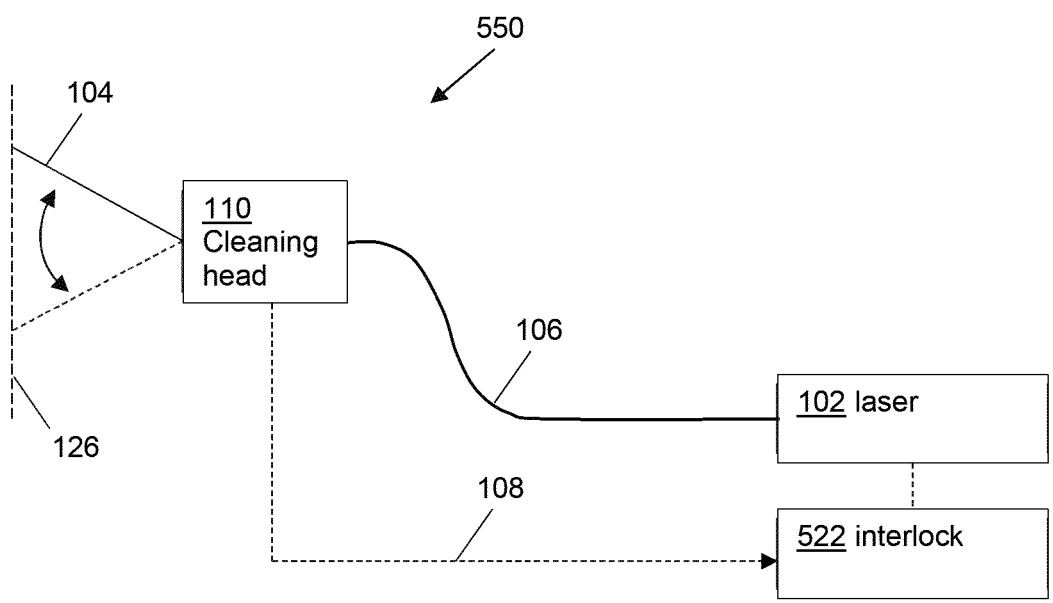

In an embodiment, illustrated in FIG. 12, the laser cleaning apparatus 550 further comprises interlock apparatus 552. The interlock apparatus is configured to cause the laser system 102 to shut down in response to receiving the alarm signal 108 generated when the scan monitoring apparatus determines that the effective divergence of the scanning laser light has changed.

Figure 13:
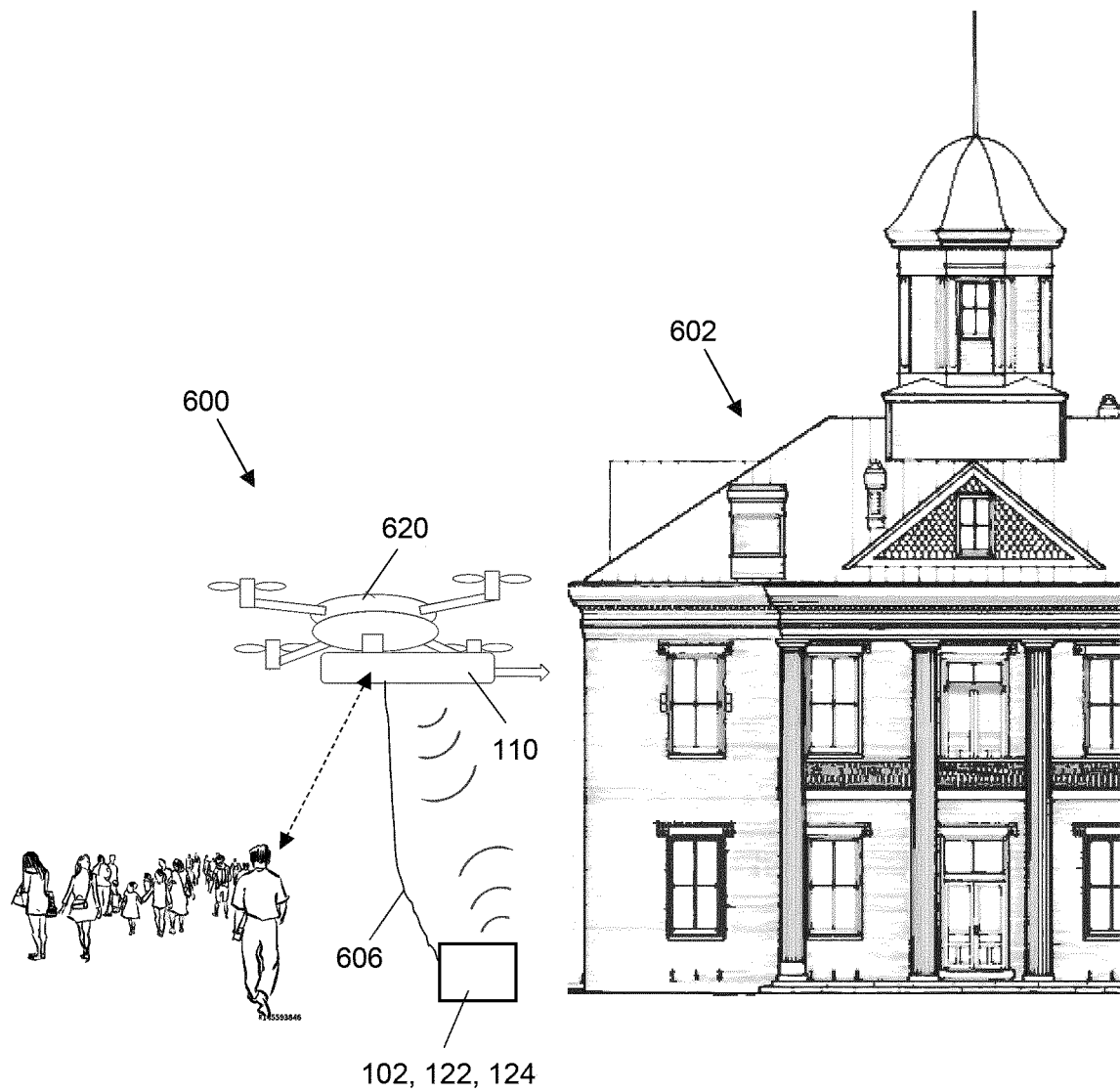

Referring to FIG. 13, an embodiment provides laser cleaning apparatus 600 comprising a laser system 102, a delivery cable 606, a cleaning head (any of the cleaning heads 110, 150, 410 described above may be used), a controller 152, as described above, and an unmanned remote vehicle, in this example an unmanned aerial vehicle, UAV, 620.

The cleaning head is mounted on the UAV, with the laser system and controller provided at ground (or floor) level. The delivery cable is configured to tether the UAV to a ground (or floor level) fixing point, which may be the laser system itself. The UAV is powered by a ground (or floor) level electrical source, to which the UAV is connected via an electrical cable which may be incorporated into or run alongside the delivery cable. The UAV can alternatively carry its own source of electrical power generation or storage.

As described above, the laser cleaning apparatus of this embodiment is configured to have a safe working distance of approximately 2.2 m. The UAV is configured to be able to fly to any position within a distance of 50 m from the laser systems, as determined by the length of the delivery cable and/or the electrical cable to the UAV.

The UAV may be configured for movement to be controlled by an operator, Alternatively, the UAV can be configured to move autonomously without the input of an operator, relying on a combination of position sensors and/or cameras to control position of the UAV in space.

As illustrated in FIG. 13, the laser cleaning apparatus may be used to clean the façade of a building 602. It may also be used to clean the surface of any large outdoor or indoor structure, such as a monument, an aircraft, a bridge, etc. The unmanned remote vehicle may alternatively be an unmanned submarine vehicle to enable the laser cleaning apparatus to be used to clean underwater infrastructure, such as oil-rigs and off-shore wind farm infrastructure, and marine vessel hulls, or a unmanned land vehicle to enable the laser cleaning apparatus to be used to clean ground level infrastructure.

The UAV is configured to operate autonomously or by ground control by an operator. The UAV has built in sensors to monitor its position in space and to ensure that the UAV remains stable in position over time, with respect to the ground and with respect to the surface to be cleaned. The UAV is configured to move to a distance from the building corresponding to approximately 200 mm from the output aperture to the surface to be cleaned, such that the surface to be cleaned (for example the façade of the building) is positioned generally at the focal plane of the scanning laser light, so that the scan region is located on the surface to be cleaned. It will be appreciated that the scan region/focal plane of the scanning laser light does not need to be exactly at the surface to be cleaned for at least some cleaning to occur, but optimum cleaning will be achieved when this condition is met as the spot size of the laser light will be at its smallest, and thus the fluence will be at its highest.

In an embodiment, the laser cleaning apparatus 600 further comprises proximity sensing apparatus. The proximity sensing apparatus creates a virtual barrier or geo-fence around the cleaning head 110, 150, 410 and is configured to monitor the space around the cleaning head to detect the presence of any unauthorised person who gets closer than a permitted access distance, which is at least the safe working distance from the aperture of the cleaning head.

The proximity sensing apparatus comprises a full field of view proximity sensor system mounted on the UAV 620, such that the location and proximity of any persons can be detected and, if within the permitted access distance, a proximity alarm signal is generated and transmitted to the interlock apparatus 122, as described above. The interlock apparatus 122 is configured to cause the laser system 102 to shut down in response to receiving a proximity alarm signal.

The proximity sensing apparatus may alternatively be mounted on the cleaning head 110, 150, 410.

The proximity sensing apparatus may comprise a camera configured to determine at least one of a presence of a body and a distance to a body, i.e. an unauthorised person. The proximity sensing apparatus may alternatively or additionally comprise a range detector configured to determine a distance to a body. The proximity sensing apparatus may be configured to recognise an operator within the safe working distance (who would be wearing laser safety glasses) and thus not generate a proximity alarm in response to the operator being closer than the safe working distance.

Figure 14:
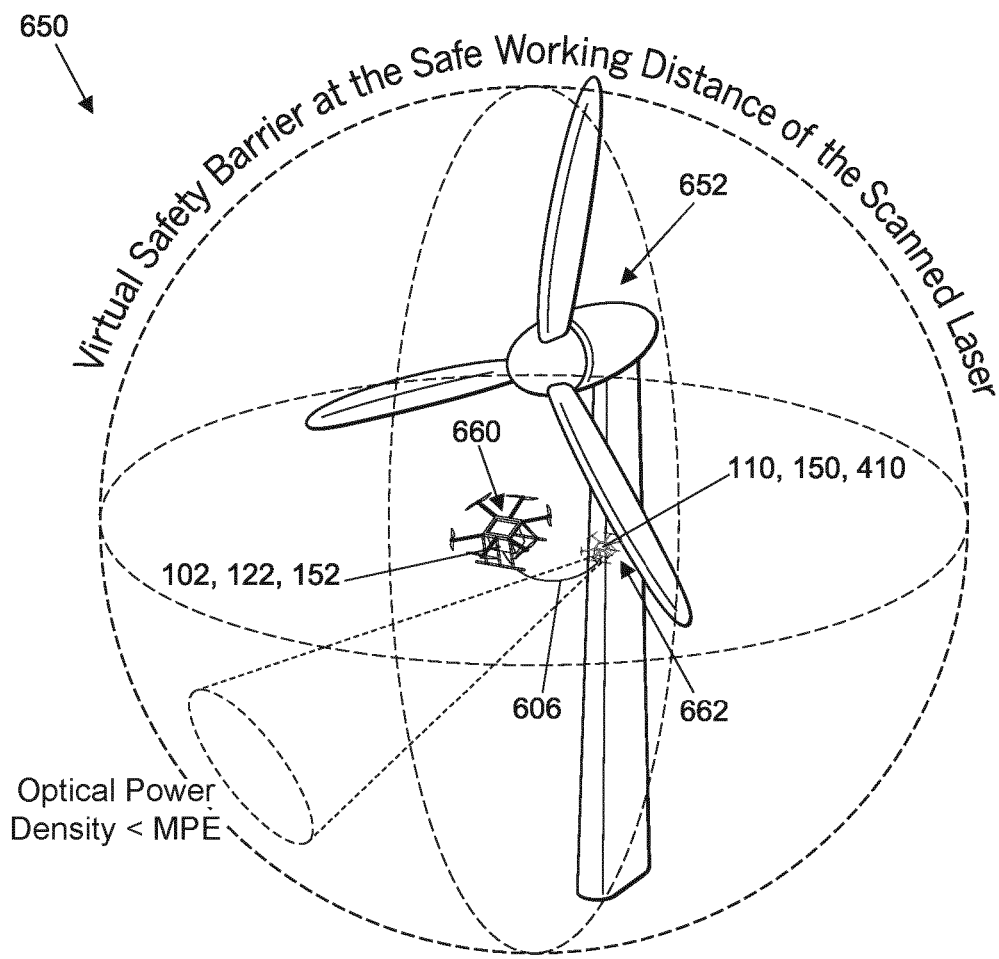

Referring to FIG. 14, an embodiment provides laser cleaning apparatus 650 comprising a laser system 102, a delivery cable 606, a cleaning head (any of the cleaning heads 110, 210, 310, 410 described above may be used), interlock apparatus 122, a controller 152, as described above, and two unmanned remote vehicles, in this example a first unmanned aerial vehicle, UAV, 660 and a second UAV 662.

The cleaning head is mounted on the second UAV, with the laser system, interlock apparatus and controller mounted on the first UAV. The delivery cable 606 is configured to tether the second UAV to the first UAV. The first UAV is powered by an onboard generator, such as a combustion engine, and the second UAV is provided with electrical power via an electrical cable which may be incorporated into or run alongside the delivery cable. The second UAV can alternatively carry its own source of electrical power generation or storage.

The apparatus 650 may be used for cleaning infrastructure in fairly remote areas where access is not restricted. In such applications, it is possible for people and animals to be within line of sight of the infrastructure but the distance from the infrastructure may be quite large—for example 10 metres or even 100 m from the infrastructure being cleaned.

Applications include the cleaning and maintenance of wind-turbines, as illustrated in FIG. 14, and blades onshore and in offshore installations as well as high-voltage electrical power transmission towers (pylons), and high voltage transmission cables and insulators.

In the case of wind-turbines, as shown in FIG. 14, the presence of contamination on the blades in the form of insects, salt and dirt from the blade surfaces results in increased drag and reduction in turbine efficiency. Removal of these contaminants through conventional cleaning approaches in remote environments is challenging due to safety, logistics and the use-of and disposal-of large amounts of water and chemicals in the process. The laser cleaning apparatus 650 enables cleaning of these assets to be carried out regularly during low-wind or planned maintenance procedures.

On many occasions there will not be anyone in the vicinity of the wind turbine that is to be clean, particularly in the case of an offshore installation. However, during maintenance there will be service people present within 10 m to 100 m of the cleaning process. Furthermore, whilst access to both onshore and offshore wind farms is typically restricted, there may be passing sea and air-vessels on an unpredictable schedule.

The laser cleaning apparatus 650 of this embodiment is configured to have a safe working distance of 10 m or less. In some applications this could be increased to 100 m or less. The laser system 102 is a 200 Watt 1064 nm Ytterbium doped pulsed fiber laser, delivering optical pulse energy of up to 40 mJ at a pulse repetition rate of 5 kHz. The laser system is air-cooled with a weight of approximately 30 kg.

The laser system 102 is mounted on the first UAV 660 which is powered by an onboard internal combustion engine, though it will be appreciated that other power sources may alternatively be used. The electrical power generated via the internal combustion engine is used to provide power both the UAV 660 and the laser system 102.

The second UAV 662 is a smaller, agile UAV that is tethered to the first UAV with power and laser light transferred to the second UAV via electrical and optical tether cable/cables, including the delivery cable 606.

The output of the laser is delivered by a short length of delivery optical fiber 606 to the cleaning head, which is configured to output a focussed 1 mm spot at a working distance of approximately 200 mm from the laser aperture 116, scanned in two dimensions over a scan region 126 of size 50 mm×50 mm at 200 mm from the aperture. When scanned in this manner, the effective divergence of the beam is increased to approximately 250 mRad, which, assuming a uniform scan speed, results in a safe working distance for the 200 Watt scanned beam of approximately 9 metres.

The first and second UAVs 660, 662 may be configured to fly autonomously or through remote piloting, close to the wind turbine. The scanned laser beam is moved over the surface of the turbine blade to be cleaned via movement of the second UAV.

The second UAV also carries proximity sensing apparatus 420, as described above, to monitor for the presence of persons or animals within a permitted access distance. In this example, the permitted access distance is at least equal to the 9 m safe working distance of the laser aperture. The proximity sensing apparatus may alternatively or additionally be provided on the first UAV.

As described above, the output of the proximity sensing apparatus is linked to an interlock on the laser system 102, enabling laser emission only when there is no detected breach of the 9 m safe working distance from the laser aperture. In this embodiment, the proximity sensing apparatus comprises two or more 3D high definition camera and at least one lidar system.

In an embodiment, the UAVs include an autonomous flight control system, including GPS location sensing to measure and control the position of the UAVs in space. A further level of positional control can also be established through the use of cameras and 3D mapping of the infrastructure being cleaned. By imaging the surface of the infrastructure using UAV-mounted high-definition cameras, the second UAV can correctly position the laser-cleaning aperture at the required position on the infrastructure, enabling accurate cleaning and safe positioning of the UAVs with respect to the infrastructure being cleaned.

In an embodiment, the second UAV is provided with a camera configured to record images of the surface to be cleaned throughout the cleaning process. The controller 152 is configured to receive the images from the camera. The controller 152 determines from the images a type of surface contaminant present on the surface to be cleaned and/or a level of contamination on the surface to be cleaned. The controller then determines at least one of the wavelength, the temporal characteristic, a scanning speed for the scanning apparatus, an amount of overlap between pulses, a number of passes of the laser light across the scan region and a size for the scan region dependent on the type of surface contaminant, the chosen safe working distance and the Maximum Permissible Exposure level. The controller generates a control signal configured to cause the scanning apparatus to scan the laser light across the scan region having the determined size.

The contaminant can include dirt which impacts performance and aesthetics, and surface degradation, such as rust or old-paint layers.

The camera may be configured to provide colour, texture and spectral properties data to the controller. The controller 152 may be configured with machine-learning capability to perform real-time evaluation of the type of contamination before, during and after the cleaning process in order to optimise the size of the scan region.

The controller 152 may also be operable to determine the wavelength and temporal characteristic of the laser system 102, dependent on the type of contaminant. It generates a further control signal to configure the laser system to output laser light having the determined wavelength and temporal characteristic.

The controller 152 may also be operable to determine a scanning speed, an amount of overlap between pulses, and a number of passes of the laser light across the scan region for the scanning apparatus. It generates a further control signal to configure the scanning apparatus to perform scanning at the determined scan speed, amount of overlap and number of passes.

Provision of the camera enables the apparatus to determine the type and/or level of contamination on a surface to be cleaned, enabling operating parameters to be varied to optimally remove the surface contaminant from the surface to be cleaned. The camera also enables the apparatus to determine whether the contaminant has successfully been removed from the surface, enabling real-time evaluation of the level of cleanliness.

It will be appreciated that a 10 m safe working distance may not be required for certain remote applications. Allowance of a larger safe working distance, would enable use of higher power lasers or would allow for use of a smaller scan area, allowing for high pulse overlap should the cleaning process speed and/or quality improve based on this approach. Equally, should a smaller safe working distance be required, the apparatus can be configured to use a lower power laser and/or a different laser which operates at a retina-safe wavelength, for example 1550 nm.

In an embodiment, the controller 152 is further configured to generate a control signal configured to cause the scanning apparatus to re-scan the laser light across the scan region dependent on a remaining level of contamination determined from the images received from the camera.

FIG. 14 illustrates the laser cleaning apparatus being used for cleaning of wind turbine blades. Equally the apparatus can be used to clean contaminants from infrastructures such as power pylons, power transmission lines or bridges for example.

Corresponding embodiments and advantages also apply to the method of laser cleaning described below.

Figure 15:
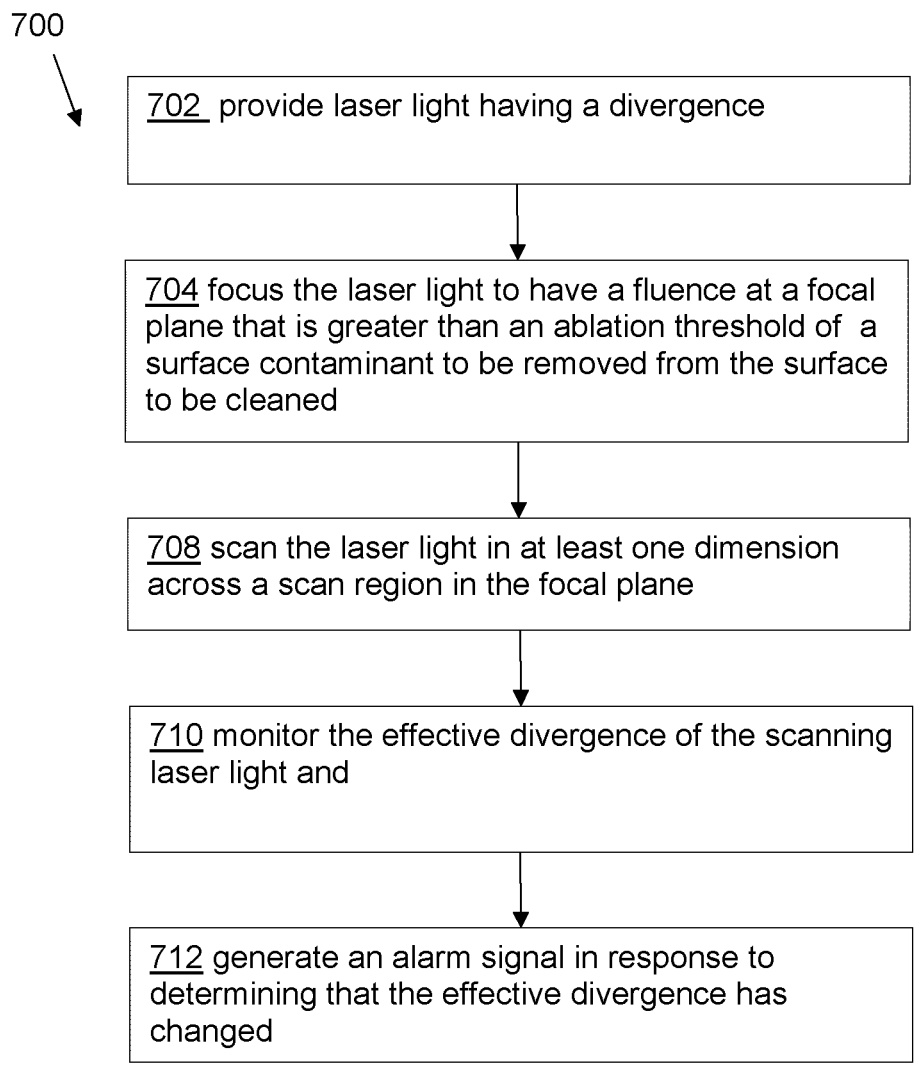
FIG. 15 illustrates steps of a method of laser cleaning according to an embodiment.

Referring to FIG. 15, an embodiment provides a method 700 of laser cleaning comprising steps as follows:

providing 702 laser light having a power, a wavelength, a temporal characteristic and a divergence;

focussing 704 the laser light to have a fluence at a focal plane that is greater than an ablation threshold of a surface contaminant to be removed from a surface to be cleaned;— scanning 708 the laser light in at least one dimension across a scan region in the focal plane to cause the scanning laser light to have an effective divergence greater than the divergence of the laser light and to have a corresponding safe working distance from the output aperture determined by the effective divergence, the power, the operating wavelength and the temporal characteristic;

monitoring 710 the effective divergence of the scanning laser light; and generating an alarm signal in response to determining that the effective divergence has changed.

In an embodiment, the method 700 further comprises steps of:

monitoring an area extending from the surface to be cleaned to at least a permitted access distance;

generating a proximity alarm signal in response to determining the presence of an unauthorised person at a position closer than the permitted access distance; and causing the laser to shut down in response to receiving the proximity alarm signal.

The permitted access distance is greater than or equal to the safe working distance.

The invention claimed is:

1. Laser cleaning apparatus comprising:
   a laser system configured to output laser light having a power, a wavelength, a temporal characteristic and a divergence;
   a cleaning head;
   proximity sensing apparatus;
   a controller;
   interlock apparatus; and
   a delivery cable configured to deliver the laser light to the cleaning head;
   wherein the cleaning head comprises:
      an output aperture and output optics configured to focus the laser light to have a fluence at a focal plane of the output optics that is greater than an ablation threshold of a surface contaminant to be removed from a surface to be cleaned;
      scanning apparatus configured to scan the laser light in at least one dimension across a scan region within the focal plane to cause the scanning laser light to have an effective divergence greater than the divergence of the laser light and to have a corresponding safe working distance from the output aperture determined by the effective divergence, the power, the wavelength and the temporal characteristic; and
      scan monitoring apparatus configured to monitor the effective divergence of the scanning laser light and to determine an amount of change of the effective divergence of the scanning laser light and configured to generate an alarm signal in response to determining that the effective divergence has changed, wherein the generated alarm signal carries information indicative of the amount of change of the effective divergence;
   wherein the proximity sensing apparatus is configured to generate a proximity alarm signal in response to determining the presence of an unauthorised person at a position closer to the output aperture than a permitted access distance, wherein the permitted access distance is greater than or equal to the safe working distance, and wherein the proximity sensing apparatus is configured to set the permitted access distance in response to receiving the alarm signal from the scan monitoring apparatus;
   wherein the controller is configured to:
   determine the permitted access distance dependent on the amount of change of the effective divergence; and
   generate a control signal configured to cause the proximity sensing apparatus to operate using the determined permitted access distance; and
   wherein the interlock apparatus is configured to cause the laser to shut down in response to receiving the proximity alarm signal.

2. Laser cleaning apparatus as claimed in claim 1, further comprising a controller configured to determine the safe working distance of the scanning laser light based on the effective divergence, the power, the wavelength and the temporal characteristic.

3. Laser cleaning apparatus as claimed in claim 1, wherein the wavelength is greater than 1400 nm.

4. Laser cleaning apparatus as claimed in claim 1, wherein the laser system is configured to output laser light having an average power of greater than 100 W, optionally greater than 200 W, optionally greater than 1 kW.

5. Laser cleaning apparatus as claimed in claim 1, wherein the scanning apparatus is configured to scan the laser light in two dimensions across the scan region.

6. Laser cleaning apparatus as claimed in claim 5, wherein the scan region has a size of up to 200 mm×200 mm, or a size of up to 100 mm×100 mm, or a size of up to 50 mm×50 mm, or a size of up to 20 mm×20 mm.

7. Laser cleaning apparatus as claimed in claim 1, wherein the safe working distance is 10 m or less.

8. Laser cleaning apparatus as claimed in claim 7, wherein the safe working distance is 4 m or less.

9. Laser cleaning apparatus as claimed in claim 1, wherein the proximity sensing apparatus comprises a camera configured to determine at least one of a presence of a body and a distance to a body and/or a range detector configured to determine a distance to a body and/or a laser scanner configured to determine at least one of a presence of a body and a distance to a body.

10. Laser cleaning apparatus as claimed in claim 1, and further comprising a controller configured to: determine a size for the scan region in response to receiving the proximity alarm signal, the size is determined to change the effective divergence and reduce the safe working distance; and generate a control signal configured to cause the scanning apparatus to scan the laser light across a scan region having the determined size.

11. Laser cleaning apparatus as claimed in claim 1, further comprising interlock apparatus configured to cause the laser to shut down in response to receiving the alarm signal from the scan monitoring apparatus.

12. Laser cleaning apparatus as claimed in claim 1, wherein the cleaning head is of a size and weight such that it can be held and moved with a user's hand.

13. Laser cleaning apparatus as claimed in claim 1, further comprising at least one unmanned remote vehicle, and wherein at least the cleaning head is mounted on the at least one unmanned remote vehicle.

14. Laser cleaning apparatus as claimed in claim 13, wherein the delivery cable is further configured to tether the at least one unmanned remote vehicle to the laser system.

15. Laser cleaning apparatus as claimed in claim 13, wherein the at least one unmanned remote vehicle comprises a first unmanned remote vehicle and a second unmanned remote vehicle tethered to the first unmanned remote vehicle, wherein the laser system is mounted on the first unmanned remote vehicle and the cleaning head is mounted on the second unmanned remote vehicle, and wherein the delivery cable extends between the first unmanned remote vehicle and the second unmanned remote vehicle.

16. Laser cleaning apparatus as claimed in claim 15, further comprising:
proximity sensing apparatus configured to generate a proximity alarm signal in response to determining the presence of an unauthorised person at a position closer to the output aperture than a permitted access distance, wherein the permitted access distance is greater than or equal to the safe working distance; and
interlock apparatus configured to cause the laser to shut down in response to receiving the proximity alarm signal,
wherein the proximity sensing apparatus is provided on at least one of the first unmanned remote vehicle and the second unmanned remote vehicle.

17. Laser cleaning apparatus as claimed in claim 2, further comprising a camera arranged to record images of the surface to be cleaned and wherein the controller is configured to:
receive the images from the camera;
determine from the images a type of surface contaminant present on the surface to be cleaned; and
determine the size of the scan region dependent on the type of surface contaminant; and generate at least one control signal configured to cause the scanning apparatus to scan the laser light across the scan region having the determined size.

18. Laser cleaning apparatus as claimed in claim 13, wherein the unmanned remote vehicle is one of an unmanned aerial vehicle, UAV, an unmanned sub-marine vehicle or a unmanned ground vehicle.

* * * * *